United States Patent [19]

Meyer et al.

[11] Patent Number: 5,091,589
[45] Date of Patent: Feb. 25, 1992

[54] PROCESS FOR THE PREPARATION OF PERFLUORINATED ETHERS

[75] Inventors: Matthias Meyer, Frankfurt am Main; Ralf Stapel, Kelkheim/Taunus; Hariolf Kottmann, Hofheim am Taunus; Thomas Gries, Frankfurt am Main, all of Fed. Rep. of Germany

[73] Assignee: Hoechst Aktiengesellschaft, Frankfurt am Main, Fed. Rep. of Germany

[21] Appl. No.: 662,763

[22] Filed: Feb. 28, 1991

[30] Foreign Application Priority Data

Mar. 2, 1990 [DE] Fed. Rep. of Germany ....... 4006491

[51] Int. Cl.$^5$ .................... C07C 43/11; C07C 41/18
[52] U.S. Cl. ................................................. 568/615
[58] Field of Search ......................................... 568/615

[56] References Cited

U.S. PATENT DOCUMENTS

| | | | |
|---|---|---|---|
| 3,242,218 | 3/1966 | Miller | 568/615 |
| 3,342,875 | 9/1967 | Selman | 568/615 |
| 3,555,100 | 1/1971 | Garth | 568/615 |
| 3,595,925 | 7/1971 | Garth | 568/615 |
| 4,847,427 | 7/1989 | Nappa | 568/615 |

FOREIGN PATENT DOCUMENTS 0154297 9/1985 European Pat. Off. .
1033574 6/1966 United Kingdom .

OTHER PUBLICATIONS

Condensed Chemical Dictionary, 10th Edition, Van Nostrand Reinhold Company, 1981, p. 787.

*Primary Examiner*—Howard T. Mars
*Assistant Examiner*—Rebecca Cook

[57] ABSTRACT

The invention relates to a process for the preparation of fluorinated ethers of the formula (I)

$$F_3C(CF_2)_2-O-(CF(CF_3)CF_2-O)_n-CHFCF_3 \qquad (I)$$

where n is an integer from 10 to 60, from the compounds of the formula(II)

$$F_3C(CF_2)_2-O-(CF(CF_3)CF_2-O)_n-CF(CF_3)COF \qquad (II)$$

where n has the above meaning, by reaction with alkali metal hydroxide at temperatures of 90° to 160° C. and in the absence of solvents.

5 Claims, No Drawings

PROCESS FOR THE PREPARATION OF PERFLUORINATED ETHERS

The invention relates to a process for the preparation of fluorinated ethers of the formula (I)

$$F_3C(CF_2)_n-O-(CF(CF_3)CF_2-O)_x CHFCF_3 \quad (I)$$

where n is an integer from 10 to 60, from compounds of the formula (II)

$$F_3C(CF_2)_n-O-(CF(CF_3)CF_2-O)_x CF(CF_3)COF \quad (II)$$

where n has the above meaning.

Fluorinated polyethers are highly stable, non-flammable oils. They are chemically stable even to strong oxidants and high temperatures. Owing to their chemical and physical properties, such as favorable viscosity behavior over wide temperature ranges, in some cases high boiling points at the same time as low pour points, low surface tension, very good dielectric properties, excellent lubricating properties combined with a very good compatibility with metals, plastics and elastomers, the fluorinated polyethers find a wide application range. Thus they are employed, for example, as inert liquids, hydraulic oils, lubricants in the chemical processing industry, the aircraft industry and nuclear technology, but also in space technology and semiconductor technology.

EP-A-154,297 describes the preparation of compounds of the formula (I) by hydrolysis and decarboxylation of compounds of the formula (II) with aqueous potassium hydroxide solution in ethylene glycol at 175° C. However, after extraction and drying the product is only obtained in 65% yield It has now been found that the decarboxylation can be carried out much more favorably using solid alkali metal hydroxide in the absence of solvents and at a lower reaction temperature than in the process according to EP-A-154,297. Extraction and drying are unnecessary in the process according to the invention, so the desired final product (I) can be obtained in high yield.

The invention relates to a process for the preparation of fluorinated ethers of the formula (I)

$$F_3C(CF_2)_n-O-(CF(CF_3)CF_2-O)_x CHFCF_3 \quad (I)$$

where n is an integer from 10 to 60, from compounds of the formula (II)

$$F_3C(CF_2)_n-O-(CF(CF_3)CF_2-O)_x CF(CF_3)COF \quad (II)$$

where n has the above meaning, which comprises reacting one or more compounds of the formula (II) with solid alkali metal hydroxide at temperatures of 90° to 160° C. and in the absence of solvents. The alkali metal hydroxide used is preferably potassium hydroxide and/or sodium hydroxide, in particular potassium hydroxide. The reaction temperature is preferably 110°–155° C., in particular 130° to 145° C.

The starting compounds of the formula (II) are obtainable as oligomerization products of hexafluoropropylene oxide, as described in more detail in GB-PS 1,033,574. The compounds of the formula (II) are in this case in general obtained as mixtures having a molar mass distribution of about 1,000–20,000 g mol$^{-1}$.

In the process according to the invention, the starting compounds of the formula (II) thus obtained can in general be employed without prepurification For this purpose, they are in general treated with 0.8 to 1.5 mol, preferably with 0.9–1.1 mol, in particular with an approximately equimolar amount of solid potassium hydroxide. This is in general employed in powdered form.

The course of the reaction can be monitored, for example, by the disappearance of the absorption bands at 1680 or at 1880 cm$^{-1}$ by IR spectroscopy. After about 6–8 hours, the reaction is in general complete.

The yield of fluorinated ethers of the formula (I) is as a rule over 90%. A change in the distribution of the molecular weights during the reaction is not detectable by gel permeation analysis. Likewise, no discoloration of the reaction mixture and no decomposition of the products is observed in the process according to the invention.

The products (I) are obtained as transparent, colorless and, depending on the molar mass, more or less viscous liquids. If a mixture of compounds (II) is employed, a mixture of products (I) is formed which can be fractionated by distillation to give the desired viscosity classes.

The products obtained are employed, for example, in the electronics and chemical industry, as well as in nuclear, aviation and space technology, as inert liquids, hydraulic oils or lubricants.

EXAMPLES

Experimental report for the preparation of the starting compounds of the formula (II)

A solution of 20 g of CsF in 50 ml of tetraethylene glycol dimethyl ether and 56 g of hexafluoropropylene oxide were initially introduced into a 4 l V-4-A autoclave under a nitrogen gas atmosphere 250 ml of Frigen ® F113 or a mixture of 50 ml of F113 and 100 g of hexafluoropropylene (HFP) were additionally added for dilution. 4,000 g of hexafluoropropylene oxide were then introduced at a temperature of −40° C. to 0° C. over a period of 8 h while mixing thoroughly. After reaction was complete, the mixture was warmed to room temperature and the crude product having a mean molecular weight of 2000–10,000 g mol$^{-1}$ was then drawn off under a nitrogen gas atmosphere. The mean molecular weight of the desired compound of the formula (II) was controlled by means of the reaction temperature. Thus, at a temperature of −35° C. a product having a mean molecular weight of 6,000–8,000 g mol$^{-1}$ was isolated and at a temperature of 0° C. a product having a mean molecular weight of about 2,500 g mol$^{-1}$ was isolated.

Example 1

As a starting compound, 18 kg of fluorinated polyester acid fluoride of the formula (II) having a mean molecular weight of 4,100 g mol$^{-1}$ (4.4 mol) were heated to 140° C. in a 20 l flask. The solvent still present (Frigen ® and HFP) were removed by distillation over a distillation bridge. 250 g (4.5 mol) of powdered, dry potassium hydroxide were then slowly added by means of a solid addition funnel. After a reaction time of 6 hours, C=O bands at 1,680 and 1,880 cm$^{-1}$ were no longer visible in the IR spectrum. After filtering off potassium fluoride, 16.1 kg of pure fluorinated polyester oil of the formula (I) were obtained (yield: 91%).

Example 2

4,000 of fluorinated polyester acid fluoride having a mean molecular weight of 2,000 g mol$^{-1}$ (2.0 mol) were heated to 130° C. in a 4 l flask. The solvents still present were removed by distillation over a distillation bridge. 112 g (2.0 mol) of powdered, dry potassium hydroxide were slowly added at a temperature of 135° C. over a period of 1-3 h after the distillation. After a reaction time of 3 to 5 hours, the reaction had ended, which, as in example 1, was detected by IR spectroscopy. After filtering off potassium fluoride, 3,595 g of pure fluorinated polyester oil were obtained (yield: 92%).

Example 3

4,000 g of fluorinated polyester acid fluoride having a mean molecular weight of 5,300 g mol$^{-1}$ (0.8 mol) were reacted with 43 g (0.8 mol) of powdered, dry potassium hydroxide after removing the solvent by distillation as described in example 2. After filtering off potassium fluoride, 3,570 g of pure fluorinated polyester oil were obtained (yield: 90%).

Example 4

4,000 g of fluorinated polyester acid fluoride having a mean molecular weight of 6,100 g mol$^{-1}$ (0.7 mol) were reacted with 37 g (0.7 mol) of powdered, dry potassium hydroxide after removing the solvent by distillation as described in example 2. After filtering off potassium fluoride, 3,650 g of pure fluorinated polyester oil were obtained (yield: 92%).

Example 5

4,000 of fluorinated polyester acid fluoride having a mean molecular weight of 9,800 g mol$^{-1}$ (0.4 mol) were reacted with 23 g (0.4 mol) of powdered, dry potassium hydroxide after removing the solvent by distillation as described in example 2. After filtering off potassium fluoride, 3,700 g of pure fluorinated polyester oil were obtained (yield: 93%).

We claim:

1. A process for the preparation of fluorinated ethers of the formula (I)

   (I)

where n is an integer from 10 to 60, from compounds of the formula (II)

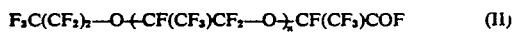   (II)

where n has the above meaning, which comprises reacting one or more compounds of the formula (II) with alkali metal hydroxide at temperatures of 90° to 160° C. and in the absence of solvents.

2. The process as claimed in claim 1, wherein the reaction is carried out at 110° to 155° C.

3. The process as claimed in claim 1, wherein the reaction is carried out at 130° to 145° C.

4. The process as claimed in claim 1, wherein potassium hydroxide and/or sodium hydroxide is/are used as the alkali metal hydroxide.

5. The process as claimed in claim 1, wherein potassium hydroxide is used as the alkali metal hydroxide.

* * * * *